United States Patent [19]

Koerner et al.

[11] 4,090,987
[45] May 23, 1978

[54] PROCESS OF PREPARING POLYETHERURETHANE FOAMS

[75] Inventors: Götz Koerner, Essen; Gerd Rossmy, Haltern-Lavesum, both of Germany

[73] Assignee: Th. Goldschmidt AG, Essen, Germany

[21] Appl. No.: 583,560

[22] Filed: Jun. 4, 1975

Related U.S. Application Data

[63] Continuation-in-part of Ser. No. 515,260, Oct. 16, 1974, abandoned, which is a continuation of Ser. No. 333,155, Feb. 16, 1973, abandoned.

[30] Foreign Application Priority Data

Feb. 22, 1972 Germany .............................. 2208149

[51] Int. Cl.² .......................... C08K 5/54; C08G 18/14
[52] U.S. Cl. .............................................. 260/2.5 AH
[58] Field of Search .................................. 260/2.5 AH

[56] References Cited

U.S. PATENT DOCUMENTS

| | | | |
|---|---|---|---|
| 3,402,192 | 9/1968 | Naluska | 260/2.5 AH |
| 3,629,308 | 12/1971 | Bailey | 260/2.5 AH |
| 3,634,344 | 1/1972 | Koerner | 260/2.5 AH |
| 3,637,541 | 1/1972 | Rossmy | 260/2.5 AH |
| 3,642,670 | 2/1972 | Kanner | 260/2.5 AH |
| 3,714,080 | 1/1973 | Dahm | 260/2.5 AH |
| 3,741,917 | 6/1973 | Morehouse | 260/2.5 AH |

Primary Examiner—C. Warren Ivy
Attorney, Agent, or Firm—Toren, McGeady and Stanger

[57] ABSTRACT

A process for the preparation of polyetherurethane foams is disclosed, wherein polyether alcohol and polyisocyanate are foamed in the presence of water or low-boiling propellant and polyalkyleneglycol-polysiloxane mixed block polymer foam stabilizer. In accordance with the invention, the mixed block polymer foam stabilizer has the general formula

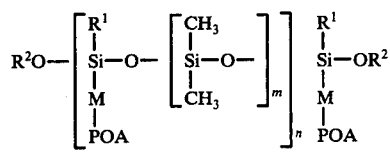

wherein
  $m$ is uniform or approximately uniform within each siloxane block of each molecule and stands for 5 or 6;

$n \geq 2$;

$R^1$ is saturated alkyl of 1 – 8 carbon atoms;
  $R^2$ is preferably saturated alkyl of 1 – 8 carbon atoms, or the group POA or $R_3^1Si$-, such as $(CH_3)_3Si$;
  M is a divalent group which in known manner links the adjacent silicon atom to POA;
  POA corresponds to the formula $(C_rH_{2s}O)_sR^3$, is composed of polyoxyethylene and polyoxypropylene units in the weight ratio of from 50:50 to 30:70; $r$ being an integer whose range is a corollary function of the specific value of said weight ratio, $s$ being an integer whose specific value or range is a corollary function of the POA block mole weight, and $R^3$ being alkyl of 1 – 8 carbon atoms or phenyl; and
  POA has a block mole weight of from 1400 – 3000, preferably from 1600 – 2200.

8 Claims, No Drawings

PROCESS OF PREPARING POLYETHERURETHANE FOAMS

CROSS-REFERENCE TO PRIOR APPLICATIONS

This ia a continuation-in-part of Ser. No. 515,260, filed Oct. 16, 1974 which, in turn, is a continuation of Ser. No. 333,155, filed Feb. 16, 1973, and both now abandoned.

FIELD OF INVENTION

The invention is directed to a procedure for the preparation of polyetherurethane foams by foaming polyether alcohol and polyisocyanate in the presence of water or low-boiling propellant and a foam stabilizer, the latter being a polyalkyleneglycol-polysiloxane mixed block polymer.

BACKGROUND INFORMATION

The use of polyoxyalkylene-polysiloxane mixed block polymers as foam stablizers for polyetherurethane foams has previously been proposed in a large number of patents and publications of which German Pat. No. 1,233,133 may be mentioned as an example. A summarizing presentation of the preparation of such polyurethane foams and of mixed block polymers, which may be used as foam stabilizers for such foams, is contained in "Polyurethanes Chemistry and Technology" by Saunders and Frisch, Volume XVI of the series "High Polymers", published by Interscience Publishers, New York, London Tl. 1 (1962) and Tl. 2 (1964).

A characteristic which is common to all mixed block polymers previously used for this purpose is that the polysiloxane block is not uniform within each molecule. Rather, the block comprises dimethylsiloxy units of widely different chain lengths. This, of course, means that in addition to low molecular polysiloxane groups, the block contains units of average chain length as well as those of extremely high mole weight, to wit, units having very long chains. In several prior art patents and publications it is suggested to use polysiloxane blocks whose statistical chain length distribution corresponds to the statistical equilibrium which is obtained by subjecting the polysiloxane blocks to an equilibration reaction.

SUMMARY OF THE INVENTION

It is the primary object of the invention to provide a foam stabilizer for use in the preparation of polyetherurethane foams which is superior to prior art foam stabilizers of the indicated kind.

Briefly, and in accordance with the invention, it has now surprisingly been ascertained that superior foam stabilizers, having a markedly improved foam stabilizing activity, are polyalkyleneglycol-polysiloxane mixed block polymer of the general formula

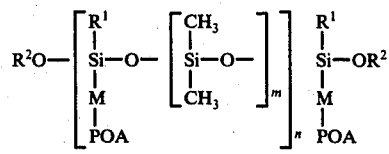

wherein $m$ is uniform or approximately uniform within each siloxane block unit of each molecule and has a value of 5 or 6;

$n \geq 2$, $R^1$ is a saturated alkyl with 1 – 8 carbon atoms;

$R^2$ is a saturated alkyl of 1 – 8 carbon atoms, or stands for the group POA or $R_3^1Si—$;

M is a divalent group which, in a manner known per se bridges the silicon atom with the POA group;

POA corresponds to the formula $(C_rH_{2r}O)_sR^3$ and is composed of polyoxyethylene and polyoxypropylene units in the weight ratio of 50:50 to 30:70;

$r$ is an integer whose specific value or range is thus a corollary function of the specific value of said weight ratio;

$s$ is an integer whose specific value or range is a corollary function of the POA block mole weight;

$R^3$ is alkyl with 1 – 8 carbon atoms or phenyl; and

POA has a block mole weight of from 1400 – 3000, preferably of from 1600 – 2200.

The preferred $R_3^1Si—$ group is $(CH_3)_3Si$.

As will be apparent from the above, the value for s is between 24 and 60.

It will be appreciated from the above that the crux of the present invention thus resides in the use of polyalkyleneglycol-polysiloxane mixed block polymer for the indicated purpose, wherein the dimethylpolysiloxane blocks are of uniform chain length within each molecule or unit, the chain length of each unit being determined by the index $m = 5$ or 6 as indicated in the formula. In this context it should, however, be noted that the improved characteristics of the foam stabilizer are retained if, instead of using equilibrium products of a wide molecular weight distribution, substantially uniform blocks are used, wherein the index $m$ fluctuates between 4 and 7, with the majority of the units having an $m$ value of 5 and 6. As a matter of fact, the number of units wherein $m$ is 5 and 6, must then be at least twice that of the number of units wherein $m$ has a value of 4 and 7. This can be made clear and illustrated by way of the molecular weight distribution curve, which in ordinary cases appears in the form of a wide flat curve (Gauss distribution) while, by contrast, in the present invention the curve corresponds to a narrow section with a narrow base and greater height.

It should be appreciated that the terms "uniform chain length" and "uniform", as used herein, are directly solely to the siloxane moiety of the molecule, and not the entire molecule. In this context the following should be considered:

All foam stabilizers of the polysiloxane polyoxyalkylene mixed copolymer type consist of molecule moieties, which are exclusively formed from siloxanes, and of molecule moieties, which are formed from polyether units. By chemical linking of these two different moieties, a large molecule is formed which exerts surface-active activities and which, provided certain selection rules are adhered to, is frequently useful for the stabilization of polyurethane foams.

The chemical reactions which lead to the two vastly different molecule moieties which, if linked together, in turn form the total stabilizer molecule, are inherently reactions that do not form uniform end products. The end products rather exhibit a wide-ranging molecular weight distribution. In respect of the siloxane moiety, the reaction is in the nature of a cohydrolysis with optionally following equilibration or it is an equilibration in which linear siloxane chains, jointly with cyclic siloxanes, can be used as starting products. In respect of the polyether moiety, alkylene oxides, such as, for example, ethylene oxide or propylene oxide, form an adduct with a starting compound which contains at least one reactive hydrogen atom, the adduct being formed by a polyaddition reaction.

It should be emphasized that, in accordance with the present invention, it is rendered possible for the first time to obtain uniformity of the siloxane blocks or moieties and thus to increase the effect of the foam stabilizers. However, no uniformity of the entire, total molecule is suggested in accordance with this invention, since this would also require uniformity of the polyether blocks or moieties. Such stabilizers, to wit, stabilizers in which the entire molecule is uniform, are not the subject matter of this invention, particularly, since uniform polyether blocks with average molecular weights as they are required as building blocks for foam stabilizers for the stabilization of polyurethane foams, cannot be produced according to the present state of the art.

The inventive realization that foam stabilizers of the indicated kind, having uniform or approximately uniform dimethylpolysiloxane groups or units, exhibit superior foam stabilizing effects run counter to that which could have been reasonably expected from the present state of the art and experience gained in other uses of surfactants. Thus, the superior foam stabilizing effect certainly could not have been predicted and is unexpected, since it is generally known that in the use of surface-active substances, mixtures of compounds of differing chain length exhibit better characteristics than the relatively pure substances. It thus can be fairly stated that the present invention successfully overcomes a prejudice of the art against the use of compounds of the kind proposed in this invention.

The polyoxyalkylene block (POA) should generally have a mole weight of from 1400 – 3000. The optimum mole weight is dependent on several factors, such as the nature of the starting substances employed for the foaming and also the particular process conditions. It should be appreciated that under certain circumstances the use of mixed block polymers may be of particular advantage wherein the molecular weight range previously indicated is exceeded or is below the above indicated lower limit of 1400. However, the range of 1400 – 3000 reflects that range which, from a practical point of view, is the most important one. Particularly preferred is a range of 1600 – 2200. The polyosyalkylene block is composed of polyoxpropylene and polyoxyethylene units, the polyoxyalkylene block containing 50–70% by weight of polyoxypropylene groups.

The group POA corresponds then to the formula $(C_rH_{2r}O)_sR^3$, wherein the value for r is determined by the propyleneoxyde content while s is an integer whose specific value or range is a corollary function of the POA block mole weight, and $R^3$ is preferably stands for alkyl with 1 – 8 carbon atoms or is phenyl. $R^3$, however, may also stand for any other suitable chain limiting group. The specific value for s is thus between 24 – 60.

$R^1$ is preferably methyl. However, also other alkyl groups, to wit, those having 2 – 8 carbon atoms may be considered which are then present either alone or in mixture, preferably in mixture with the methyl group.

$R^2$ is preferably ethyl or isopropyl.

The above explanations are also applicable if $R^2$ stands for a polyoxyalkylene group. The group $R^2$ may also comprise the grouping $(CH_3)_3Si$ as a chain limiting terminal member. However, as it will be appreciated by the skilled art worker, other chain limiting terminal members may be selected for this purpose.

In respect of the group M, it is noted that M is the linking or bridging member between a silicon atom and the polyoxyalkylene group. The meaning for the symbol M is of secondary importance. It may stand for oxygen, but M may also be an alkyleneoxy group with 1 – 3 carbon atoms. Persons skilled in this art know that mixed block polymers wherein the silicon atom is connected to the polyoxyalkylene group via an alkyleneoxy group are more resistant to hydrolysis than those wherein the polyoxyalkylene group is linked to the silicon atom through oxygen. Other linking principles are known, which however, from a practical point of view have lesser importance. Thus, for example, the groups

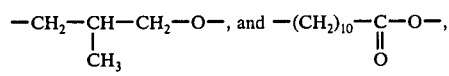

may be used wherein the carbon atom is linked with the silicon atom and wherein the terminal oxygen atom is connected to the polyoxyalkylene group.

Another bridging member has the structure

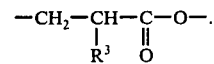

Also in this instance the terminal carbon atom is connected with the silcon atom and the terminal oxygen atom with the POA group. $R_3$ stands then for hydrogen or methyl.

The preparation of such foam stabilizers to be used in accordance with the invention and having the inventive uniform or substantially uniform polysiloxane block may be carried out as follows:

(1) Synthesis of 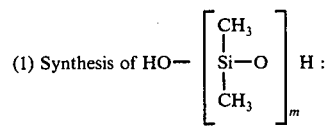

The polydimethylsiloxanediols of the mentioned formula, which are used as starting product may be readily synthesized by hydrolysis of the corresponding αωdichloropolydimethylsiloxanes of the formula

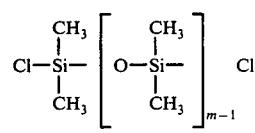

in an aqueous medium. For the purpose of preventing the formation of local concentrations of hydrochloric acid, acid acceptors, such as amines, are added to the medium and the medium is vigorously agitated during the hydrolysis. The polydimethylsiloxanediols thus obtained and, after having been well washed, may, if necessary, again be distilled through a column under reduced pressure.

(2) Synthesis of compounds of the formula

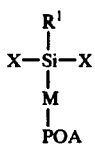

wherein X is a group which is reactive towards SiOH and preferably stands for chlorine or

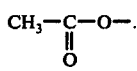

These silanes may be prepared by an addition reaction between polyethers having terminal olefinic groups, such as for example polyethers with terminal allyl groups, and silanes of the formula

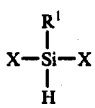

by hydrosilation, for example, in the presence of platinum catalysts. In this manner, silanes are formed in which the polyether block POA is linked to the silicon atom through an alkyleneoxy group. Silanes in which the polyether POA is connected with the silicon through oxygen may, by contrast, be prepared by reacting polyethermonols in the presence of acid acceptors, such as tertiary amines, with silanes of the formula $R^1$—Si—$X_3$. These silanes are then used in a great excess amount and the excess is removed after the reaction by distillation.

(3) The inventive mixed block polymers may then be prepared by adding, in dropwise manner and under effective agitation, a mixture of the polydimethylsiloxanediols of (1) above and tertiary amines to the silanes of (2) above. The reaction is preferably carried out in the presence of inert solvents. Further, it is advantageous to dissipate the reaction heat by cooling. The weight relationship between the components in the preparation of the inventive mixed block polymer should preferably be as follows:

Silanes of (2): $n + 1$ moles
Polydimethylsiloxanediols of (1): $n$ moles
Tertiary amines (mixed with the polydimethylsiloxanediols of (1):$2n + 2$ moles.

It is advantageous if the tertiary amines are used in excess.

In the reaction of the silanes (2) with the polydimethylsiloxanediols (1) in the indicated mole ratio, a residue of X groups remains first in unreacted form. This residue is ultimately brought to reaction in the final stages by adding to the reaction mixture compounds of the formula $R^2OH$. Also in this case it is advantageous to use a certain excess so as to make sure that the SiX groups, which upon hydrolysis split off acid, are completely removed. After the reaction, the salts are removed by filtration and ultimately the inventive products are obtained by removing excess ingredients together with the inert solvents by distillation to the extent this is feasible.

The improved foam stabilizing characteristics of the mixed block polymers to be used for foaming purposes in accordance with the invention are primarily demonstrated by the fact that the amounts of foam stabilizers which are necessary to achieve satisfactory stabilization of the foam, both during its formation and also after it has been completely formed, are considerably less than the quantities required when prior art stabilizers are used. Customarily, in the production of such foams not less than 0.5% by weight of stabilizer, calculated on the foaming system, have been used in the past. By contrast, if inventive substances are employed, it is frequently sufficient to add only 0.1% by weight.

The invention will now be described with reference to the following Examples, it being understood, however, that these Examples are given by way of illustration and not by way of limitation and that many changes may be effected without affecting in any way the scope and spirit of the invention as recited in the appended claims.

The following Example 1 is concerned with the preparation of the foam stabilizers to be used in accordance with the invention, this preparation, however, not foaming the subject matter of this invention. Example 2 deals with foaming tests which were carried out with the inventive foam stabilizers, the Example also including a comparison or control which demonstrates that the amount of stabilizer of the invention necessary to obtain good foams is significantly below the amount of prior art stabilizers.

EXAMPLE 1

(a) Preparation of the siloxanes of the formula

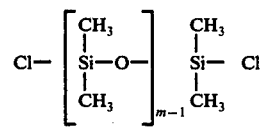

These products are prepared by very careful fractional distillation through a column of a mixture obtained by deficiency hydrolysis of dimethyldichlorosilane. The purity of the products was tested in gaschromatographic manner.

The following Table indicates the boiling points and the gaschromatographically determined purity.

| m | Boiling Point | Content in %, determined by gaschromatography |
|---|---|---|
| 4 | 105° C/15 mm | 97.5 |
| 5 | 131° C/15 mm | 98 |
| 6 | 154° C/15 mm | 93.5 |
| 7 | 145° C/ 3 mm | 94 |
| 9 | 176° C/ 3 mm | 98 |

(b) Preparation of the siloxanes of the formula

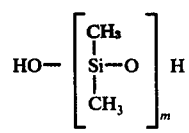

The synthesis of these products is carried out according to a procedure which is briefly summarized in the following:

1 Mole of

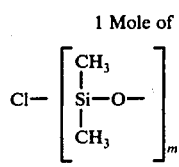

is dissolved in four times the amount by weight of CH$_2$Cl$_2$. This solution is added in dropwise manner and within a period of 2 hours to a mixture of 177.3 gram (3 mole) of isopropylamine and an amount of H$_2$O which corresponds to ⅛ of the weight amount of CH$_2$Cl$_2$. In doing so, the mixture is vigorously agitated and is cooled in such a manner that the temperature of the reaction mixture does not excees 35° C. The mixture is then neutralized with acetic acid of 25% concentration, the aqueous phase is separated and the organic phase is washed with distilled water. The washing with the water is repeated at least 5 times. The CH$_2$Cl$_2$ is then removed by distillation which is carried out at a bath temperature of up to 50° C. and vacuum conditions of 12mm Hg. The following Table 2 indicates the purity degrees of the products and the ascertained OH value.

| m | Content in % | OH-Content in % found | theoretical |
|---|---|---|---|
| 4 | 97.8 | 10.5 | 10.8 |
| 5 | 98.3 | 8.6 | 8.75 |
| 6 | 97.9 | 7.2 | 7.35 |
| 7 | 93.7 | 5.9 | 6.3 |
| 9 | 98 | 4.85 | 4.95 |

(c) Synthesis of the silanes of the formula

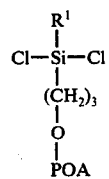

Also this synthesis was performed according to methods described in the chemical literature.

1850 grams (1 mole) of an allylbutylpolyether of the formula

CH$_2$=CH—CH$_2$—O—(C$_t$H$_2t$O)$_s$—n—C$_4$H$_9$ having a weight ratio of oxypropylene to oxyethylene groups of 56.5 : 43.5 in statistical distribution, were mixed with 90 mg pyridine (ethylene) PtCl$_2$ and heated to a temperature of 120° C. At this temperature and within a time period of 2 hours, 230 g (2 mole) of methyldichlorosilane were added in dropwise manner. The mixture thus obtained was permitted to after-react at the same temperature for an additional period of 5 hours. The excess of methyldichlorosilane was thereafter removed by distillation at a bath temperature of 120° C. and at a pressure of 15 mmHg. The residue has a Cl-content of 3.68%. The theoretically to be expected Cl-content is 3.61% so that the amount of chlorine in the residue well corresponds to the theoretical value.

Synthesis of silanes of the formula

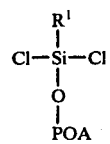

598.4 g (4 mole) of methyltrichlorosilane were mixed with 800 ml of toluene and 111.3 g (1.1 mole) of triethylamine. 1810 g (1 mole) of a polyether of the formula n—C$_4$H$_9$O—(C$_t$H$_2t$O)$_x$H were added in dropwise manner to the above referred mixture within a time period of 2 hours. The weight ratio of the oxypropylene to oxyethylene groups in the compound n—C$_4$H$_9$O—(C$_t$H$_2t$O)$_x$H was 56.5:43.5 and the adduct was produced by an addition reaction between ethyleneoxide and propyleneoxide and n-Butanol, the oxypropylene and oxyethylene groups being in statistical distribution. The system was vigorously agitated during the reaction and the inside temperature of the mixture was maintained at 25° C. by cooling. After a postreaction period of 1 hour, the system was filtered under exclusion of moisture, the methyltrichlorosilane and the triethylamine excess were removed by distillation together with the toluene at a temperature not exceeding 70° C. and under vacuum conditions 15mmHg. The residue as again filtered under exclusion of moisture. The residue had a Cl-content of 3.80%. The theoretically to be expected Cl-content is 3.69% so that the chlorine content of the residue well conformed to the theoretical value.

(d) Synthesis of the inventive product of the formula

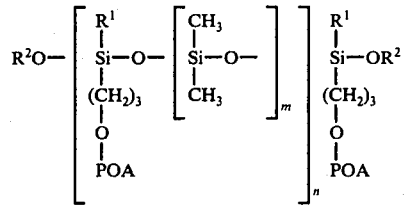

Charge: n mole of α,ω-Dihydroxypolydimethylsiloxane (prepared according to the procedure described under (b) above)

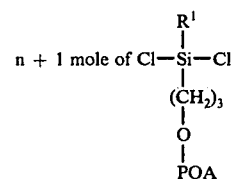

(produced according to the procedure of (c) above 2.2 . n + 2.2
mole of triethylamine (anhydrous)
3 moles (50% excess) of the compound R$^2$OH.

Toluene in an amount so that a weight ratio of toluene : total amount of the other ingredients of 2 : 1 is present.

The silane was placed in a vessel together with the toluene. Thereafter, and within a time period of 2 hours, a mixture of
α, ω-Dihydroxypolydimethylsiloxane
and triethylenamine were added in a dropwise manner under agitation. By suitably cooling the reaction mixture, the temperature was maintained between 20° and 25° C. After a post-reaction period of 2 hours, $R^2OH$ is added and the system is filtered after additional 2 hours of reaction period. Toluene, $R^2OH$ and triethylamine excess were then removed by distillation at a temperature up to 70° C. and at a pressure of 15mmHg and the residue was again filtered.

If the silane

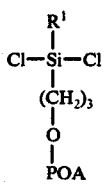

which was used as starting substance in the reaction here described, is replaced instead by a silane of the formula

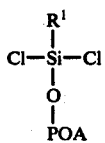

whose synthesis is also shown in Example 1 c), a polyalkyleneglycol-polysiloxane mixed block polymer is obtained which corresponds to the formula

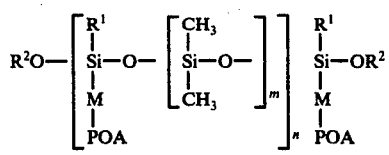

wherein M = —O—.

(e) Evidence that the uniformity of the siloxane blocks is maintained in the described synthesis.

If, corresponding to Example 1 (d) 62.2 g (0.15 mole) of

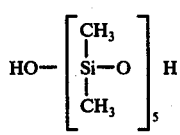

are reacted with 134.6 g (0.9 mole) of methyltrichlorosilane in the presence of 33.6 g (0.33 mole) of triethylamine as acid acceptor in 460 g of toluene then, according to gaschromatographic anlysis, 85% of the theoretical amount of

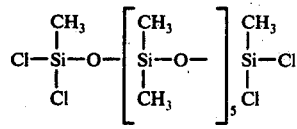

are obtained.

The product which was purified by means of preparatory gaschromatography, had an acid value of 6.21 m val/g (theoretical amount : 6.24 m val/g). The nuclear resonance spectrum of this substance exhibited a signal distribution for the protons of the different methyl groups which also confirmed the above formula.

EXAMPLE 2

Testing of the inventive products in comparison with products of the prior art

With a view to demonstrating the foam stabilizing capability of the products, the following formulation was employed:

100 g of polyether-triol, consisting of 93-95% by weight of oxypropylene units and 5 - 7% by weight of oxyethylene units; OH-number: 45 to 50, obtained by addition of ethyleneoxide and propylene oxide to glycerine 0.27 g of tinoctoate
4.05 g of $H_2O$
0.15 g of N,N-dimethylethanolamine
0.05 g of N-ethylmorpholine
X g of silicone-foam stabilizer
3 g of monofluorotrichloromethane
52.5 g of toluylenediisocyanate; isomeric ratio: 2.4 to 2.6 = 80 : 20

Within this formulation, the amount of foam stabilizer was now varied and it was determined which minimum concentration was necessary to obtain satisfactory foams. This minimum concentration is indicated as the limit concentration. The results are tabulated in the following Table 3.

Table 3

| n | m | $R^1$ | $R^2$ | M | Limit Concentration | Remarks |
|---|---|---|---|---|---|---|
| Inventive Range | | | | | | |
| 2 | 5 | $CH_3$ | $C_2H_5$ | —$(CH_2)_3$—O— | 0.3 | |
| 4 | 5 | $CH_3$ | $C_2H_5$ | —O— | 0.2 | |
| 30 | 5 | $CH_3$ | $C_2H_5$ | —$(CH_2)_3$—O— | 0.1 | |
| 4 | 6 | $C_2H_5$ | i-$C_3H_7$ | —$(CH_2)_3$—O— | 0.2 | |
| 30 | 6 | $C_2H_5$ | i-$C_3H_7$ | —$(CH_2)_3$—O— | 0.1 | |
| 4 | 4-7 | $CH_3$ | i-$C_3H_7$ | —$(CH_2)_3$—O— | 0.3 | 11%m=4; 42%m=5; 35%m=6; 10%m=7; |
| 30 | 4-7 | $CH_3$ | i-$C_3H_7$ | —$(CH_2)_3$—O— | 0.3 | 11%m=4; 42%m=5; 35%m=6; 10%m=7; |
| Results obtained with prior art foam stabilizer | | | | | | |
| — | — | — | — | — | 0.35 | |
| Comparison with stabilizers outside the scope of the invention | | | | | | |
| 4 | 4 | $CH_3$ | i-$C_3H_7$ | —$(CH_2)_3$—O— | 0.4 | very coarse foam |
| 30 | 4 | $CH_3$ | i-$C_3H_7$ | —$(CH_2)_3$—O— | 0.35 | very coarse foam |
| 4 | 7 | $CH_3$ | i-$C_3H_7$ | —$(CH_2)_3$—O— | 0.4 | very coarse foam |
| 30 | 7 | $CH_3$ | i-$C_3H_7$ | —$(CH_2)_3$—O— | 0.35 | very coarse foam |
| 2 | 9 | $CH_3$ | i-$C_3H_7$ | —$(CH_2)_3$—O— | 1.2 | very coarse foam |
| 2 | 5 | $CH_3$ | $C_2H_5$ | —$(CH_2)_3$—O— | 1.2 | not uniform value of m = 5, but equilibrated |

Table 3-continued

| n | m | R¹ | R² | M | Limit Concentration | Remarks |
|---|---|----|----|---|---------------------|---------|
|   |   |    |    |   |                     | siloxane |

It will be noted that line 1 of Table 3 lists a stabilizer which, in accordance with the invention, was prepared with siloxane blocks of the claimed uniformity. By contrast, the last line of the Table lists a stabilizer with the same average composition but produced according to the prior art by utilizing equilibrium adjustment by means of equilibration. Comparison of the limit concentrations clearly indicates that the inventive uniform compounds have about four times the activity of the equilibrated stabilizers.

EXAMPLE 3

Differences in the molecular distribution between a conventionally equilibrated siloxane block and a siloxane block pursuant to the invention.

Test 1

A mixture of 0.5 mole of hexamethyldisiloxane, 2 mole of octamethylcyclotetrasiloxane and 0.25 mole of tetramethyltetrahydrogencyclotetrasiloxane were equilibrated under optimum conditions. Sulfuric acid ws used as equilibration catalyst, sulfuric acid being a well known equilibration catalyst (See, for example British Patent 1015611, page 10, lines 39–45).

The equilibration siloxane had the averge composition:

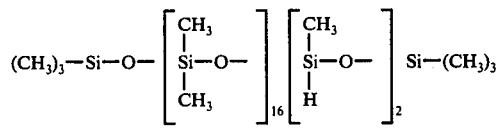

and thus corresponds to the siloxane block of the compound E-2 as appearing in column 12 of U.S. Pat. No. 3,629,308. The active hydrogen content was established to be 0.134% which, in comparison to the theoretical value of 0.137%, must be considered a very good result.

The siloxane block thus obtained was subjected to gas-chromatographic analysis in order to obtain information concerning the molecular distribution. As first stage, distillative preseparation was carried out, in which the ultimate conditions were a temperature of 250° C and a vacuum of 2 mm Hg. Under these conditions, only 19.5% if volatile components were obtained from the batch. This can reasonably be interpreted as a first general indication that the substance had a wide molecular weight distribution. A very wide distribution spectrum was obtained for the volatile phase pursuant to the gas-chromatographic analysis. A listing of the contents of the individual components with associated retention times is tabulted in Table A hereinbelow. This Table gives the clear impression to the effect that a mixture of the most different individual components is formed during the equilibration. The compound which is identified most frequently, characterized by a retention time of 382 seconds, has in this mixture merely a concentration of 10.3%.

Test 2

The following test is intended to give information as to whether the equilibration is significantly more effective, if it is carried out with linear siloxanes prepared by hydrolysis of dimethyldichlorosilane. Further, the test serves the purpose to yield informtion regarding the exact molecular distribution of the compound type as it is listed for comparison purposes in the last line of Table 3. For this purpose, dimethyldichlorosilane was hydrolyzed, the stoichiometric reaction course being conducted in such a manner that the average composition of the ultimate product corresponded to the formula:

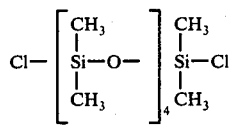

The mixture resulting from the hydrolysis reaction was equilibrated with $H_2SO_4$ and subjected to gas-chromatogrphic investigation. The result is tabulated in Table B. Due to the simpler structure of the substance, it was possible to determine not only the retention time but also to make reasonable inferences concerning the chemical composition of the individual components. The analysis again clearly indicated a wide mixture of compounds, the mixture being composed of cycles of $\alpha,\omega$-dichlorodimethylsiloxanes and of dimethylsiloxanyl units.

In the column "Inferences" of Table B, the letter "N" indicates a linear $\alpha,\omega$-dichlorodimethylsiloxane, while the subsequent numeral indicates the number of Si-atoms contained in the identified compound. The letter "D" indicates a cycle built up from dimethylsiloxanyl units, while the subsequent number indicates the number of such units per cycle.

As shown in Table B, also the equilibration of linear siloxanes results in the formation of a mixture which in no way satisfies the uniformity of the units as required by this invention. The desired compound is contained in the equilibrated mixture to an extent of 13.4% only. By contrast, in the stabilizers of the present invention, compounds are obtained which are exclusively formed from the blocks $N_5$ or $N_6$. The equilibration as carried out in accordance with the present test, thus does not yield the required uniformity of these blocks. Moreover, the total content of the two compounds $N_5$ and $N_6$, to wit, 13.4% + 11.2% = 24.6%, is far below the content claimed herein, since the moiety composed of $N_4$ and $N_7$ is 23.6%. According to the teachings of this invention (claim 5), in such a case an inventive compound would have to contain at least 47.2% of $N_5$ and $N_6$. It is thus demonstrated that the equilibration method does not satisfy the conditions of this invention.

Test 3

The siloxane blocks, prepared according to tests 1 and 2, must for purposes of producing a foam stabilizer, be linked with the polyether blocks by a chemical reaction. This test examines whether this chemical reaction has an influence on the distribution of the starting mixture. For this purpose, it is necessary to choose the chemical reaction in such a manner that it should largely correspond to the actual production of a stabilizer. On the other hand, a reaction partner has to be chosen, such that the rection product still satisfies the condition necessary for ascertaining the molecular distributions according to known analytical methods. The preparation of an inventive foam stabilizer takes place, as hereinabove described, in detail, first via the stage of the α,ω-dihydroxy-polydimethylsiloxane by hydrolysis of the corresponding chlorosiloxane.

For this purpose, the chlorosiloxane of test 2 was dissolved in four times the amount by weight of $CH_2Cl_2$. Thereafter, a solution of isopropylamine (1.5 mole per val Si—Cl) and water (half the amount by weight of the amount of chlorosiloxane employed) was prepared. The chlorosiloxane solution was added in drop-wise manner to this amine solution under agitation. By regulating the drop velocity and by exterior cooling, the temperature of the reaction mixture was maintained below 35° C. Upon termination of the hydrolysis, the system was neutralized with acetic acid of 25% concentration and the aqueous phase was separated. The organic phase was washed five times with water and subsequently the solvent was removed by distillation at 50° C and 12 mm Hg.

The next step for obtaining the foam stabilizer was the linking with the polyether blocks, as disclosed in detail in the application. This step was carried out while using methyltrichlorosilane as reaction partner, since the use of substituted polyethers would make the analytic control impossible.

In order to carry out the linking reaction, the following substances were used:
1.0 mole of OH-siloxanes obtained by hydrolysis;
6.0 mole of methyltriclorosilane; and
2.2 mole of triethylamine.

The reaction was carried out in toluene as solvent. The amount of toluene which was used was twice the amount by weight of the employed three reactants. The methyltrichlorosilane was prepared as solution and the mixture of OH-siloxane and triethylamine was added in drop-wise manner to the solution under agitation. By adjusting the drop speed and by cooling, the reaction temperature was maintained at 20°-25° C. After the reaction had terminated, the reaction product was removed by filtration and was liberated of solvent by distillation (temperature 70° C, vacuum 15 mm Hg). The distillation residue was once more filtered. The compound obtained in this manner had the average composition:

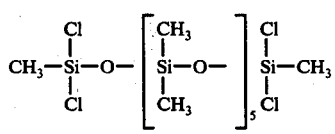

It showed upon gas-chromatographic analysis a distribution corresponding to attached Table C.

RESULT: Also the reactions necessary for forming the foam stabilizer by linking its building blocks do not have an influence such that the molecular distribution of equilibrated siloxane blocks changes to an extent so as to meet the inventive requirements. Nothing of the kind suggested and claimed in the present application in respect of uniformity is achieved. The displacement in respect of content of the main component, as seen when comparing Tables B and C, to wit, from 14.1%, 15.0%, 13.4% and 11.2% by weight to 17.3%, 16.6% 13.1% and 10.0% by weight, is essentially not caused by chemical side- or rearrangement reactions. It is rather caused by the fact that the constant weight increase per mole, obtained by the reaction in the relative sequence of the weight percentages, results in a greater increase with shorter siloxane blocks than it does with longer ones.

The molecular distribution which thus can be obtained by equilibration, has now to be compared with the distribution as it is obtained according to the procedure for preparing the inventive stabilizers.

As stated in the application, the concentration of a compound in accordance with the invention may be 85%. This content was gas-chromatographically determined and the compound was unambiguously identified by means of the so-called nuclear resonance spectroscopy method.

The above tests demonstrate the analytic concretization in respect of the composition of the inventive polysiloxane-polyoxyalkylene mixed block copolymers and those obtained pursuant to conventional methods.

TABLE A

| Retention time (seconds) | % content | Retention time (seconds) | % content |
|---|---|---|---|
| 257 | 1.5 | 854 | 1.7 |
| 282 | 7.3 | 877 | 0.7 |
| 307 | 0.6 | 892 | 1.3 |
| 329 | 4.3 | 907 | 0.7 |
| 338 | 0.6 | 929 | 0.3 |
| 361 | 5.9 | 943 | 0.5 |
| 382 | 10.3 | 959 | 0.2 |
| 411 | 2.1 | 978 | 0.1 |
| 433 | 6.5 | 992 | 0.2 |
| 458 | 2.2 | 1008 | 0.1 |
| 478 | 3.2 | 1027 | 0.1 |
| 502 | 2.8 | | |
| 522 | 6.2 | | |
| 547 | 0.5 | | |
| 565 | 1.2 | | |
| 583 | 3.3 | | |
| 602 | 5.6 | | |
| 626 | 0.1 | | |
| 639 | 0.9 | | |
| 655 | 3.5 | | |
| 672 | 4.8 | | |
| 705 | 1.1 | | |
| 721 | 3.8 | | |
| 737 | 4.3 | | |
| 766 | 1.2 | | |
| 782 | 3.4 | | |
| 798 | 3.2 | | |
| 823 | 1.0 | | |
| 838 | 2.3 | | |

TABLE B

| Retention time (seconds) | % content | Inference re composition |
|---|---|---|
| 33 | 2.9 | $N_1$ |
| 158 | 7.4 | $N_2$ |
| 266 | 3.1 | $D_4$ |
| 289 | 14.1 | $N_3$ |
| 361 | 1.6 | $D_5$ |
| 397 | 15.0 | $N_4$ |
| 458 | 0.4 | $D_6$ |
| 491 | 13.4 | $N_5$ |
| 548 | <0.1 | $D_7$ |
| 574 | 11.2 | $N_6$ |
| 647 | 8.6 | $N_7$ |
| 714 | 6.7 | $N_8$ |
| 776 | 5.1 | $N_9$ |
| 834 | 3.7 | $N_{10}$ |
| 890 | 2.5 | $N_{11}$ |
| 943 | 1.7 | $N_{12}$ |
| 995 | 1.0 | $N_{13}$ |
| 1046 | 0.7 | $N_{14}$ |
| 1107 | 0.4 | $N_{15}$ |
| 1154 | 0.2 | $N_{16}$ |

TABLE C

| Retention time (seconds) | % content |
|---|---|
| 112 | 2.4 |
| 273 | 2.6 |
| 315 | 3.1 |
| 371 | 3.2 |
| 408 | 1.2 |

TABLE C-continued

| Retention time (seconds) | % content |
|---|---|
| 468 | 1.2 |
| 504 | 0.1 |
| 533 | 5.4 |
| 557 | 0.1 |
| 617 | 17.3 |
| 691 | 16.6 |
| 757 | 13.1 |
| 819 | 10.0 |
| 877 | 7.9 |
| 931 | 6.0 |
| 983 | 4.5 |
| 1033 | 2.6 |
| 1083 | 1.5 |
| 1134 | 0.6 |
| 1186 | 0.2 |

What is claimed is:

1. In a process wherein a polyetherurethane foam is prepared by foaming polyether polyols and polyisocyanate in the presence of water of low-boiling propellant and a polyalkyleneglycol-polysiloxane mixed block polymer foam stabilizer, the improvement which comprises that the mixed block polymer foam stabilizer has the general formula

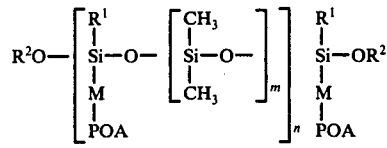

wherein the mixed block polymer comprises dimethylpolysiloxane units wherein $m$ has a value between 4 and 7, provided the number of units wherein $m = 5$ or 6 is at least twice the number of units wherein $m = 4$ and 7; $n \geq 2$, $R^1$ is saturated alkyl of 1 - 8 carbon atoms, $R^2$ is saturated alkyl of 1 - 8 carbon atoms, the group POA or $R_3^1$Si—, M is a divalent group which links the adjacent silicone atoms to POA, POA corresponds to the formula $(C_rH_{2r}O)_sR^3$ and is composed of polyoxyethylene and polyoxypropylene units in the weight ratio of from 50 : 50 to 30 : 70, $r$ is an integer whose specific value or range is a corollary function of the specific value of said weight ratio and $R^3$ is saturated alkyl of 1 - 8 carbon atoms or phenyl, and $s$ is an integer whose specific value or range is a corollary function of the POA block mole weight, POA has a block mole weight of from 1400 - 3000, said stabilizer prepared by adding a polydimethylsiloxanediol having the formula

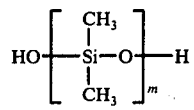

with a tertiary amine to a compound having the formula

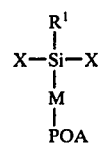

wherein X is a group which is reactive towards SiOH and then removing any residue of the X groups by adding compounds having the formula $R^2OH$ to the reaction mixture.

2. The improvement of claim 1, wherein $R_3^1Si$ is $(CH_3)_3Si$.

3. The improvement of claim 1, wherein said POA block mole weight is between 1600 - 2200.

4. The improvement of claim 1, wherein $R^2$ is ethyl or isopropyl.

5. The improvement of claim 2, wherein $R^1 =$ methyl.

6. The improvement of claim 1, wherein M is oxygen or $(CH_2)_t$—O—, wherein $t = 1$ to 3.

7. The improvement of claim 1, wherein $s = 24 - 60$.

8. In a process, wherein a polyetherurethane foam is prepared by foaming polyether polyols and polyisocyanate in the presence of water or low-boiling propellant and a polyalkyleneglycol-polysiloxane mixed block polymer foam stablizer, the improvement which comprises that the mixed block polymer foam stabilizer has the general formula

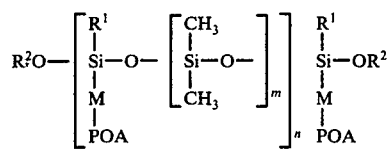

wherein the mixed block polymer comprises dimethylpolysiloxane units wherein $m$ has a value between 4 and 7, provided the number of units wherein $m = 5$ or 6 is at least twice the number of units wherein $m = 4$ and 7, $n \geq 2$, $R^1$ is saturated alkyl of 1 - 8 carbon atoms, $R^2$ is ethyl or isopropyl, M is a divalent group which links the adjacent silicone atom to POA, POA corresponds to the formula $(C_rH_{2r}O)_sR^3$ and is composed of polyoxyethylene and polyoxypropylene units in the weight ratio of from 50 : 50 to 30 : 70, $r$ is an integer whose specific value or range is a corollary function of the specific value of said weight ratio and $R^3$ is saturated alkyl of 1 - 8 carbon atoms of phenyl, and $s$ is an integer whose specific value or range is a corollary function of the POA block mole weight, POA has a block mole weight of from 1400 - 3000.

* * * * *